United States Patent [19]
Smith et al.

[11] Patent Number: 5,644,456
[45] Date of Patent: Jul. 1, 1997

[54] MAGNETICALLY CAPPED DUAL MAGNETORESISTIVE REPRODUCE HEAD

[75] Inventors: Neil Smith, San Diego; Jay D. Freeman, Leucadia, both of Calif.

[73] Assignee: Eastman Kodak Company, Rochester, N.Y.

[21] Appl. No.: 583,578

[22] Filed: Jan. 5, 1996

Related U.S. Application Data

[63] Continuation of Ser. No. 180,255, Jan. 12, 1994, abandoned.
[51] Int. Cl.$^6$ .............................. G11B 5/39; G11B 5/147
[52] U.S. Cl. ............................................ 360/113; 360/126
[58] Field of Search ........................................ 360/113, 126

[56] References Cited

U.S. PATENT DOCUMENTS

| | | | |
|---|---|---|---|
| 4,356,523 | 10/1982 | Yeh | 360/113 |
| 4,800,457 | 1/1989 | Kryder et al. | 360/113 |
| 4,803,580 | 2/1989 | Mowry | 360/113 |
| 4,896,235 | 1/1990 | Takino et al. | 360/113 |
| 4,914,538 | 4/1990 | Howard et al. | 360/113 |
| 5,084,794 | 1/1992 | Smith | 360/113 |

Primary Examiner—Craig A. Renner
Attorney, Agent, or Firm—William F. Noval

[57] ABSTRACT

A magnetically permeable "cap" is deposited across the top face (the bottom face being the face at the head-medium interface), or on the end faces, or on both the top and the end faces of a DMR reproduce head. The top cap serves as a magnetic keeper which provides flux closure between the two MR elements of the DMR when they are transversely magnetized anti-parallel to each other. By means of a magnetic cap of only moderate effective permeability, the current density required to optimally bias a DMR head is reduced by a factor of from 3 to 4. The presence of the top cap layer also provides an increase in the intrinsic sensitivity (independent of the bias level) of the DMR by a factor of 2. Further, when the head is fully biased to also include longitudinal biasing of the MR elements, the caps at the longitudinal ends of the MR stripes magnetically stabilize the fully antisymmetric bias configuration providing optimal performance for a DMR head. The end caps also provide for establishing the necessary electrical conductive path between the two MR elements of the DMR. In an additional embodiment, an electrically insulating layer between the magnetically permeable layer and the MR elements breaks any exchange coupling between the magnetically permeable layer and the MR elements.

7 Claims, 5 Drawing Sheets

MAGNETICALLY CAPPED DUAL MAGNETORESISTIVE REPRODUCE HEAD

This is a continuation of application Ser. No. 08/180,255, filed 12 Jan. 1994, now abandoned.

BACKGROUND OF THE INVENTION

1. Field of the Invention

This invention relates to a magnetic reproduce head, and in particular to a dual magnetoresistive reproduce head.

2. Description Relative to the Prior Art

As magnetic recording technology continues to push areal recording density limits, the magnetoresistive (MR) reproduce head appears to be the technology of choice. For adequate cross-track resolution with decreasing reproduce track width in the MR head, it is desirable that the MR element height be less than the track width. For current biased heads (where the sense current simultaneously acts as bias source), such as the dual magnetoresistive head (DMR) or MR heads (shielded or unshielded) employing soft-adjacent layer biasing, the mean bias magnetization level achievable for a given maximum permissible current density depends on the head geometry. For the DMR in particular, the mean bias magnetization level varies quadratically with the MR element height in the small MR element height limit, and at the small (<1 μm) element heights desirable for optimal cross-track resolution in ultra high density recording systems, optimal biasing of the MR element(s) may not be feasible at realistic current densities. The result of running the MR head at below optimal bias results in loss of reproduce signal level and increased non-linear distortion.

SUMMARY OF THE INVENTION

The invention teaches deposition of a magnetically permeable "cap" across the top face (the bottom face being the face at the head-medium interface), or on the end faces, or on both the top and the end faces of the DMR reproduce head. The top cap serves as a magnetic keeper which provides flux closure between the two MR elements of the DMR when they are transversely magnetized anti-parallel to each other as disclosed in U.S. Pat. No. 5,084,794, hereby incorporated by reference. By means of a magnetic cap of only moderate effective permeability, the current density required to optimally bias a DMR head is reduced by as much as a factor of from 3 to 4. The presence of the top cap layer also provides an increase in the intrinsic sensitivity (independent of the bias level) of the DMR by as much as a factor of 2. Further, when the head is fully biased to also include longitudinal biasing of the MR elements, the caps at the longitudinal ends of the MR stripe lengths magnetically stabilize the fully antisymmetric bias configuration providing optimal performance for a DMR head. The end caps can also provide an independent means for establishing the necessary electrical conductive path between the two MR elements of the DMR, and allows the use of a dielectric gap spacer.

BRIEF DESCRIPTION OF THE DRAWINGS

The invention will be described with respect to the figures, of which.

DESCRIPTION OF THE PREFERRED EMBODIMENTS

Figure 1:
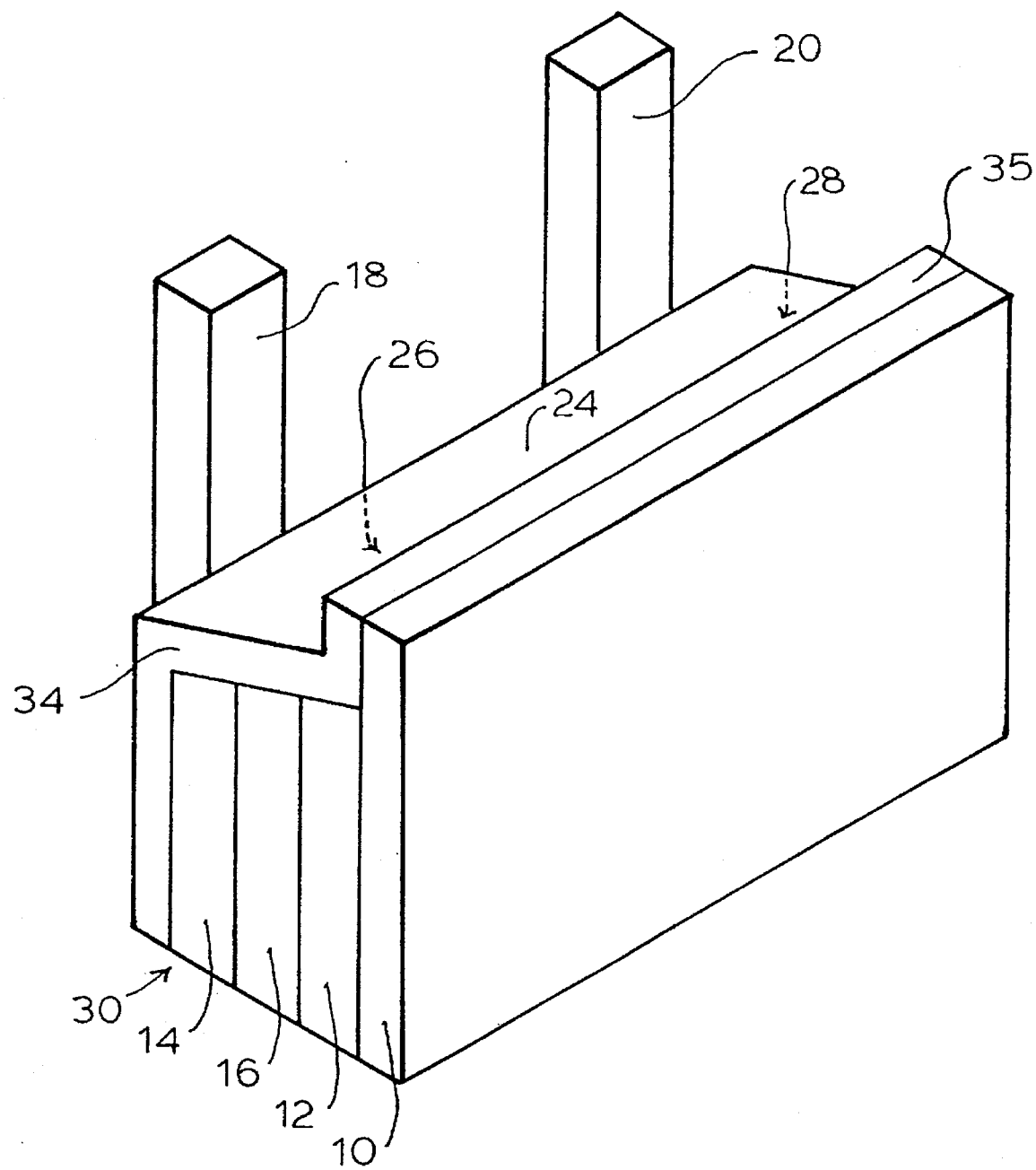
FIG. 1 illustrates a DMR reproduce head in accordance with the invention.

Referring to FIG. 1, a DMR reproduce head is deposited in a manner known in the art on the surface of a substrate 10, and consists of MR elements 12, 14, a spacer 16, and current leads 18, 20. The practice of the invention then teaches depositing a magnetically permeable material over the top 24, side 26, and ends 28, 30 of the DMR reproduce head in the manner described below.

Figure 2A:
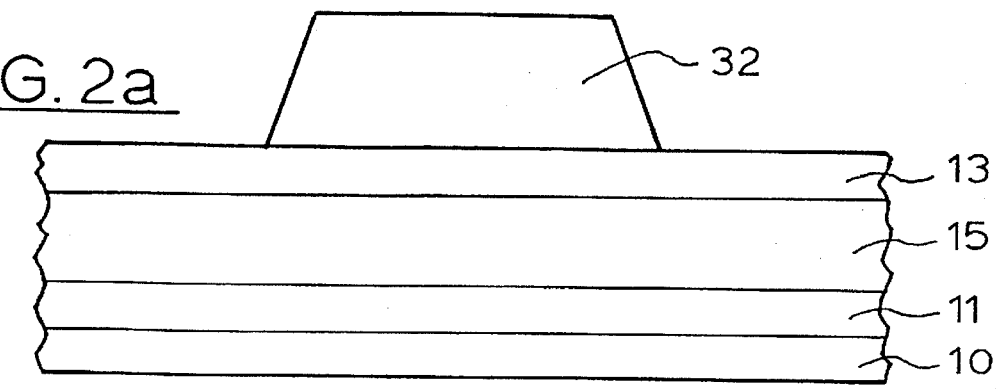
FIGS. 2a–2d are drawings representing the steps in fabricating a DMR head in accordance with the invention.

In FIG. 2a, an MR film 11 is deposited on the substrate 10, followed by deposition of a spacer film 15, and an MR film 13. The MR films 11, 13 are typically of NiFe magnetoresistive material, and the spacer film 15 may be deposited Ti if conductive, or $SiO_2$ if dielectric. All depositions take place in the presence of a dc magnetic field oriented along the direction of the longitudinal axes of the MR elements. A layer of photoresist 32 is patterned over the upper MR film 13 extending to establish the lengths and heights of the MR elements 12, 14 and spacer 16. The deposited material is then etched away in a manner known in the art leaving the structure shown in FIG. 2b. A layer of magnetically permeable material 34 such as CoZr is then deposited over the exposed structure to obtain the configuration illustrated in FIG. 2c. The structure of FIG. 2c is subjected to a "lift off" process known in the art, providing the resultant structure seen in FIG. 2d. The current leads 18, 20 shown in FIG. 1 are then deposited onto the surface of the MR element 14 in a manner known in the art, and the substrate 10 is lapped along the line 36 to uncover the bottom face of the head which is the head-medium interface.

Figure 2B:
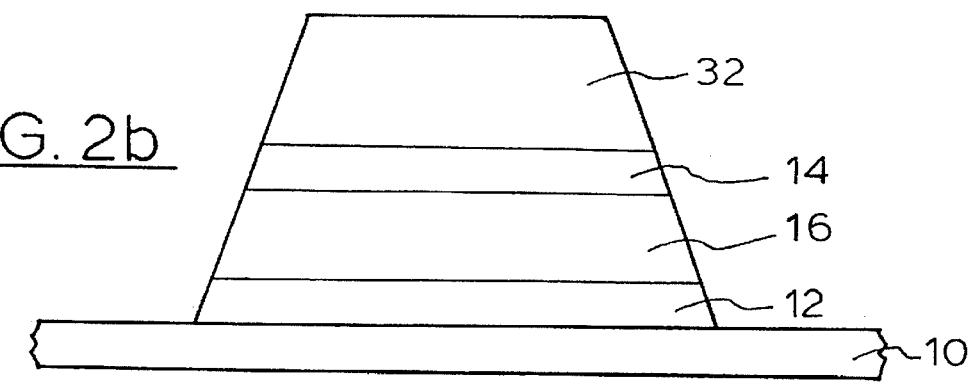
Figure 2C:
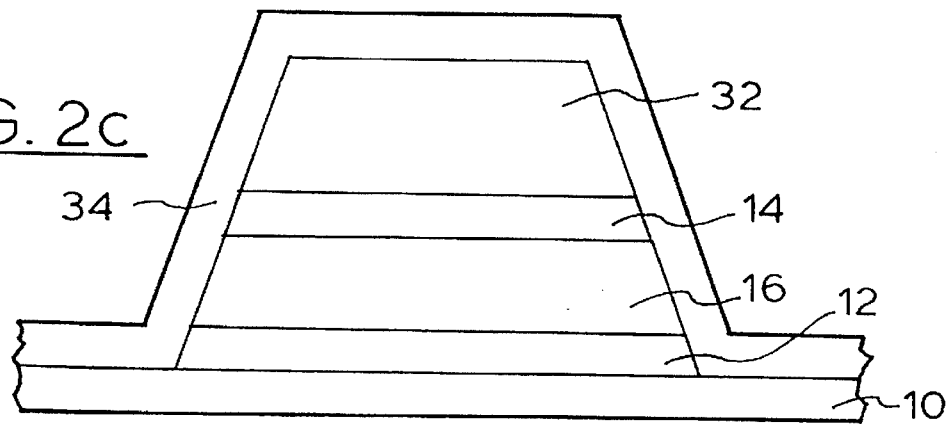
Figure 2D:
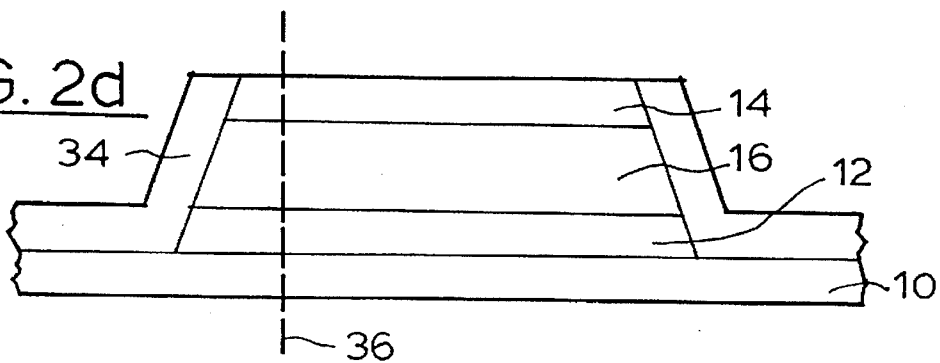

It will be noted that the formation of the top cap illustrated in FIGS. 2c–2d results in an unwanted artifact in the form of a stub of cap material 35 as seen in FIG. 1. The stub 35 runs along the cap 34 in the same direction as the longitudinal axes of the MR elements 12, 14 and hence in the same direction of the sense current flow in the MR elements 12, 14. While the top cap thickness is on the order of less than 1000 angstroms, the height of the stub 35 ranges from 0.5 to 1 μm, as set by photolithographic limits. The stub 35 being conductive resultantly provides an unwanted shunt path for the sense current flowing in the MR elements 12, 14, and to minimize this shunting effect the cap material's resistivity is chosen to be large relative to the resistivity of the MR elements 12, 14. When used with MR elements of NiFe, a cap material of suitable high resistivity is CoZr.

At the stage of the fabrication process shown in FIG. 1, the magnetically permeable layer covers all the faces except the bottom lapped face of the head. If the head is not to be provided with longitudinal bias in the manner to be described below, the permeable layer 34 may be etched away from the end faces 28, 30 prior to lapping. FIG. 1 shows the DMR without the magnetic permeable layer 34 covering the end face 30.

Figure 3:
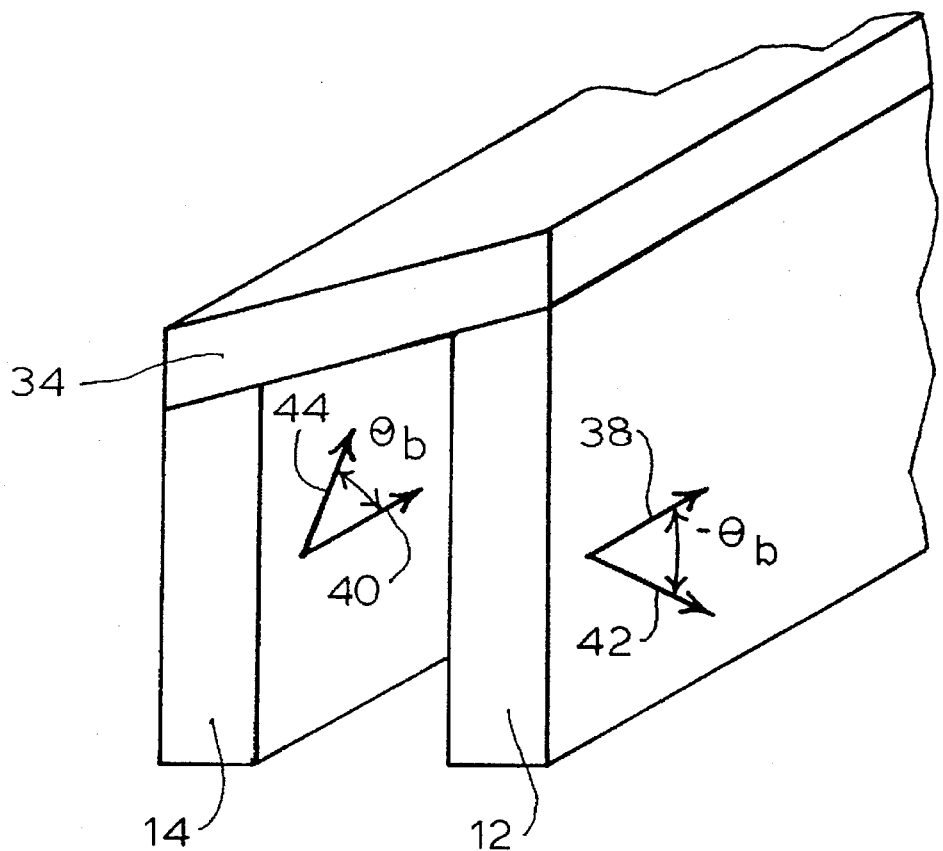
FIG. 3 is a schematic representation of a portion of the head of the invention useful in understanding the invention.

The function of the cap of the permeable material 34 may be understood from the simplified schematic of the head assembly shown in FIG. 3. In FIG. 3, the MR elements 12, 14 are shown capped by magnetic permeable material 34, the gap spacer being omitted from the figure for clarity. Equal currents 38, 40 flow in the MR elements 12, 14 serving as sense currents and simultaneously as transverse biasing currents. The unbiased magnetizations of the elements 12, 14 are oriented longitudinally, and under the influence of the transverse magnetic fields due to the biasing currents 38, 40 are rotated by the angles $-\theta_b$ and $+\theta_b$, resulting in the anti-symmetric biased magnetizations 42, 44. It will be appreciated that the reluctance of the path traversed by the flux from the biasing magnetizations is reduced by the "magnetic keeper" implemented as the cap of permeable material 34 straddling the MR elements 12, 14. This reduction in path reluctance results in the increased efficiency of the transverse biasing, and allows current reduction to provide optimal biasing, as seen in FIG. 4.

Figure 4:
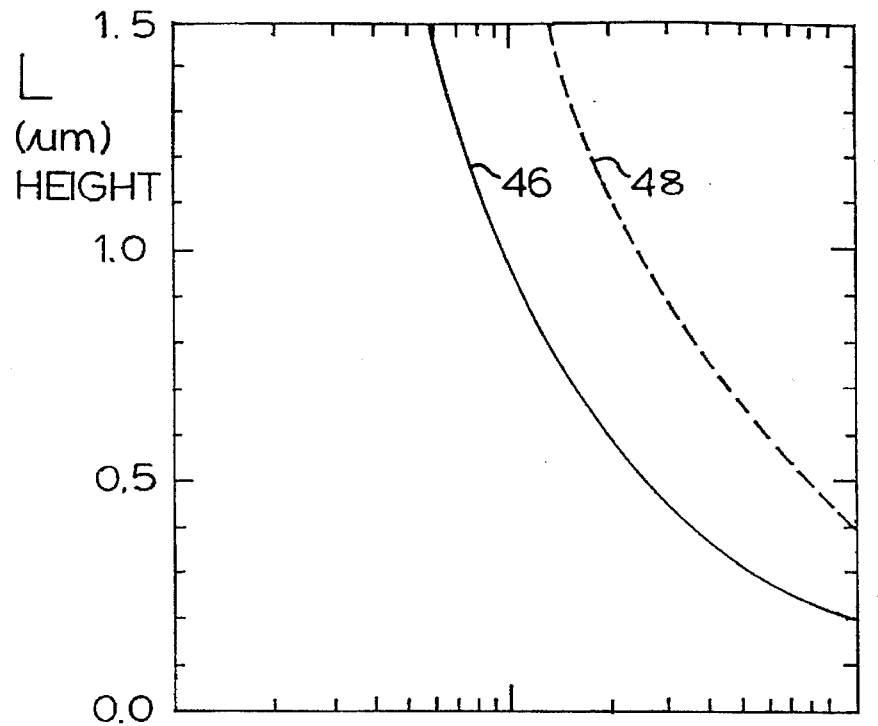
FIG. 4 is a plot relating the height of the MR elements of the DMR to the current density of the head.

The curve 46 of FIG. 4 illustrates the current required for optimal biasing of a capped DMR as a function of element height L, while curve 48 is the corresponding curve for an equivalent conventional uncapped head. The curves generally show the increase in current required for optimal biasing as the element height decreases, and more importantly show the superior biasing efficiency of the capped DMR over the uncapped head. For example, for an element height of 1 µm the uncapped DMR requires about 3 times the current as the capped DMR for equivalent optimal biasing. Additionally, it is generally held that a value of current density J between $1 \times 10^7$ amp/cm$^2$ and $3 \times 10^7$ amp/cm$^2$ is likely the maximum that can be maintained over time in MR elements before device failure due to either thermal effects or electromigration occurring. Assuming an acceptable $J_{max}$ of $2 \times 10^7$ amp/cm$^2$, FIG. 4 indicates a minimum element height L of about 1.2 µm for the conventional DMR, while this is reduced to only 0.5 to 0.6 µm for the capped DMR. This difference, roughly a factor of 2 in the small height limit, can be quite significant for very high density applications requiring a trackwidth equal to, or less than, 1 µm.

Each curve of FIG. 4 was calculated for a DMR head having element thickness of 0.02 µm, gap thickness of 0.05 µm, saturation magnetization $10^4$ gauss, and an anisotropy field of 5 oersteds. The curve 46, corresponding to the capped head, is representative of a cap having an edge permeance (effective permeability of the cap times a geometrical factor on the order of 1) of 100, while the curve 48 is for the uncapped head effectively having a free space edge permeance of approximately 0.7. It will be appreciated that only a modest magnetic characteristic is required in the cap material in order to effect the improvement in biasing efficiency taught by the invention.

Figure 5:
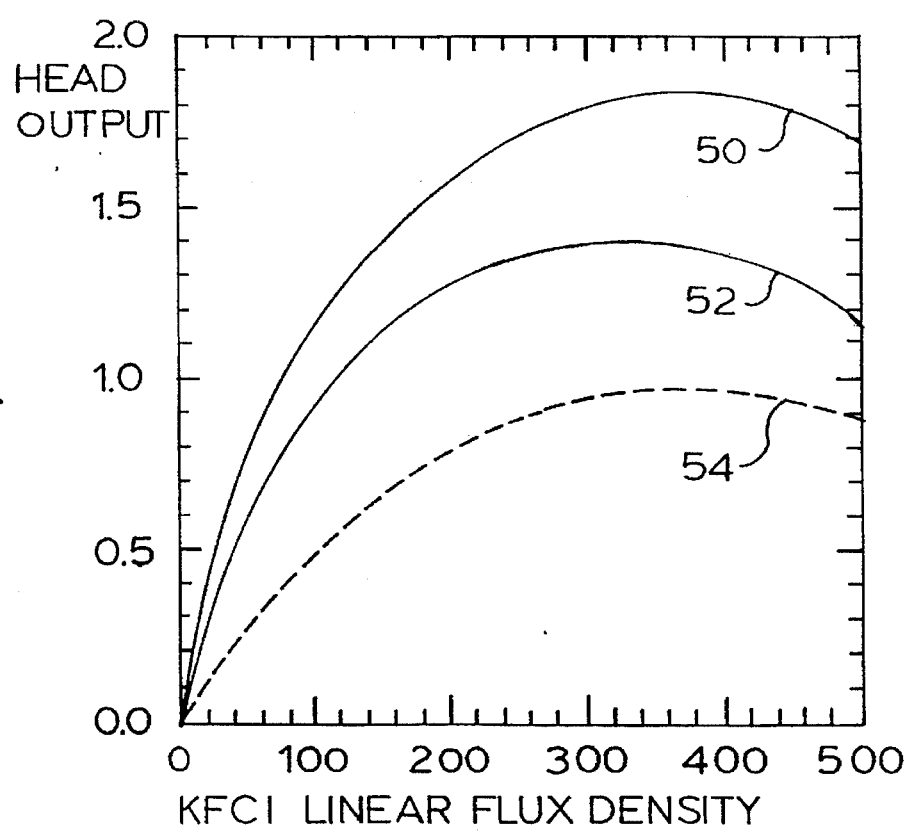
FIG. 5 is a plot of the head output against flux density for the head of the invention.

For an MR element height of 0.5 µm, FIG. 5 illustrates the increase in signal output effected by the practice of the invention. The curve 50 represents the head response as a function of linear flux density for the capped head where the edge permeance of the cap equals 100. The curve 52 for a head having a cap with an edge permeance of only 10 shows an improvement in response of about 50% relative the response 54 for an uncapped head.

Figure 6:
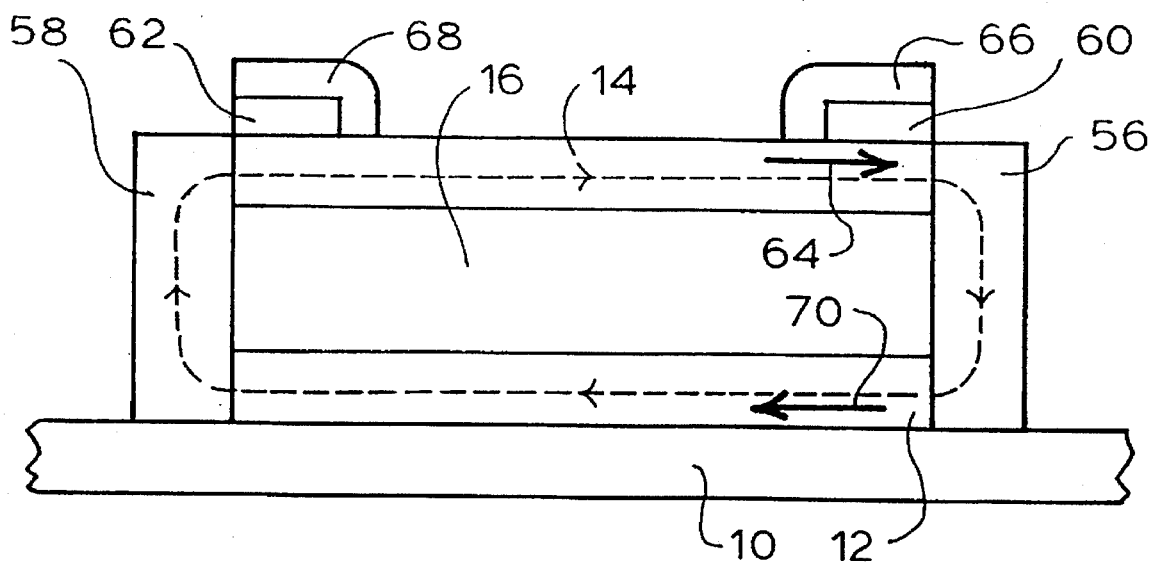
FIG. 6 is a drawing showing a head having end caps in accordance with the invention.

As mentioned supra, it is often desirable to include longitudinal biasing in the DMR to stabilize the magnetic characteristics of the MR elements. The end caps, which are a natural by-product of the fabrication technique of capping the head structure, contribute to an effective and simple means for stabilizing an anti-symmetrical longitudinal bias state, as illustrated in FIG. 6. In this plan view looking down on the top of the head structure (the top cap is omitted for clarity), the MR elements 10, 14, spacer 16 and substrate 10 are shown with magnetic end caps 56, 58 in place. The longitudinal magnetization component 64 of the MR element 14 is "pinned" to the right as seen in FIG. 6, by the deposition of exchange tabs 60, 62 at the ends of the MR 14. The use of exchange biasing tabs at the ends of a magnetoresistive layer is described in the article "Unshielded MR Elements with Patterned Exchange Biasing", C. Tsang, IEEE Transactions on Magnetics, Vol. 25, No. 5, September 1989, pp 3692–3694. TbCo and FeMn are suitable materials for the exchange tabs 60, 62. The biasing and sense current leads 66, 68 are then deposited over the exchange tabs 60, 62 as shown. The deposition process for laying down the magnetic cap material as illustrated in FIGS. 2a–2d naturally includes covering of the ends of the head structure with the end caps 56, 58. The caps 56, 58 serve as magnetic "keepers" for the longitudinal bias flux from the magnetizations of the magnetoresistive elements 12, 14. It will be noted that the MR element 12 is not provided with its own exchange tabs to urge its magnetization along the direction opposite to that of the magnetization 64 of element 14. The presence of the end caps 56, 58 provide a high permeability path between the MR elements 12, 14 so that longitudinal flux from MR element 14 flows in a continuous circumferential manner through the end caps 56, 58 into MR element 12, orienting the magnetization 70 of the MR element 12 in the required direction anti-parallel to that of the MR element 14. This reliance on the end caps 56, 58 to help set the direction of the magnetization 70 without providing that element with its own exchange tabs simplifies the deposition process for the fully biased DMR.

It will also be noted that with the current leads attached only to one MR element, the top cap enhances the sharing of sense current between the elements 12, 14 due to the cap material's electrical conductivity. Therefore, in the top capped DMR the spacer 16 may be a dielectric spacer, with the electrical shorting between the MR elements 12, 14 performed by the capping material.

In the preferred embodiments disclosed supra, the top cap material is in contact with each MR element along the thin top edge equal to the thickness of the MR element. As previously described, the cap material is deposited under the influence of the same dc magnetic field as are the MR elements themselves. Resultantly, the magnetization of the cap material lies along the direction of the longitudinal axes of the MR elements. Recalling that the longitudinal bias flux of the MR elements 12, 14 are anti-parallel, it will be seen that the magnetization of the top cap material is in the direction aiding the magnetization of one of the MR elements, say MR element 12, but bucking the magnetization of the other MR element 14. Because of the thinness of the MR thickness, this is not detrimental to DMR operation unless there is actually exchange coupling between the top cap layer and the top edge of the MR element whose magnetization opposes that of the cap. To obviate this possibility, an additional embodiment of the invention discloses the deposition of a very thin layer of insulating material on the head structure before the deposition of the cap material.

Figure 7A:
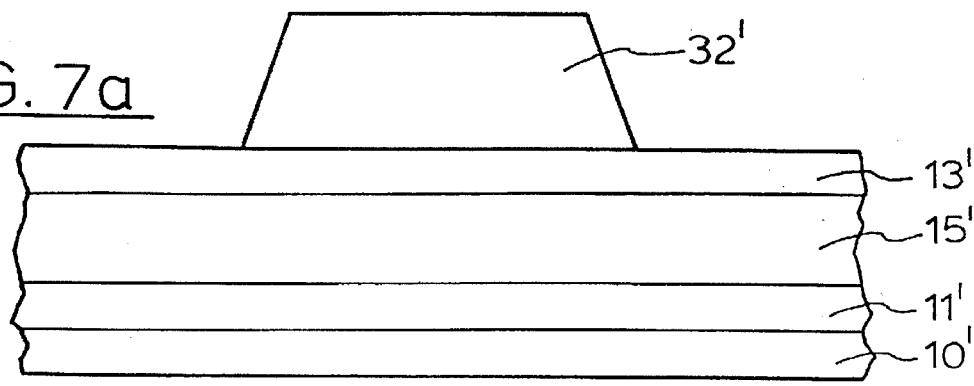
FIGS. 7a–7d are drawings illustrating the steps in fabricating a second embodiment of the invention.
Figure 7B:
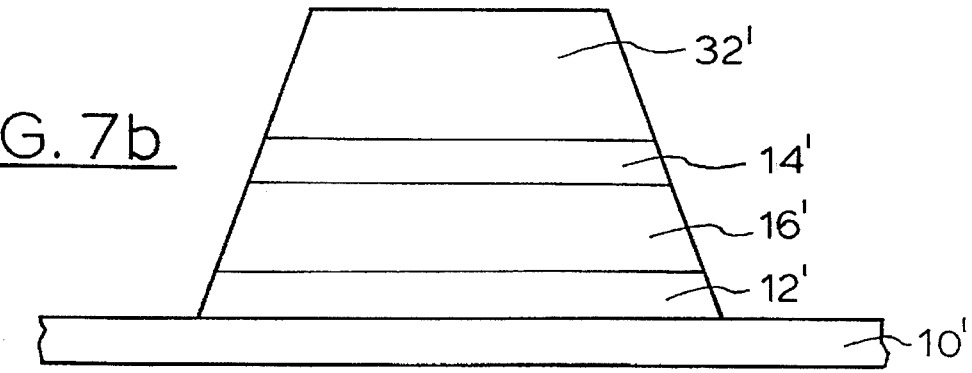
Figure 7C:
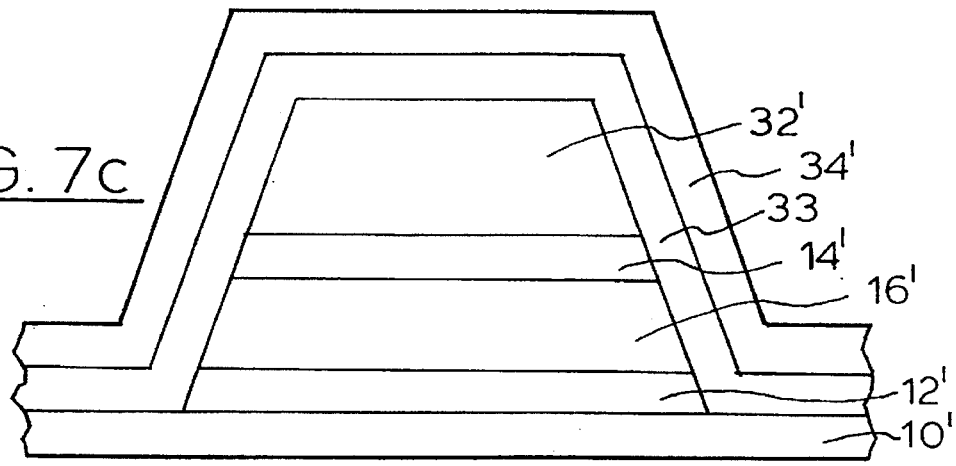
Figure 7D:
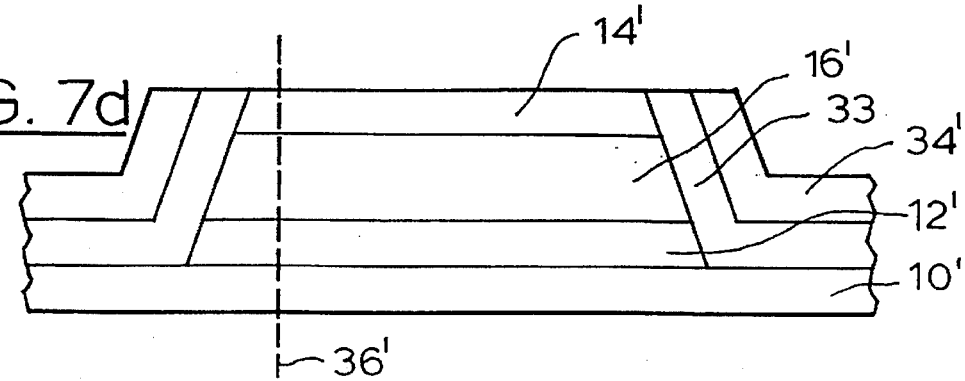

Referring to FIG. 7a and 7b, the fabrication steps described in connection with FIGS. 2a–2b are repeated. (In the drawings, different but related elements are designated by the same reference character, albeit the associated elements are differentiated by primes.) In FIG. 7a, an MR film 11' is deposited on the substrate 10', followed by deposition of a spacer film 15', and an MR film 13'. The MR films 11', 13' are typically of NiFe magnetoresistive material, and the spacer film 15' may be deposited Ti if conductive, or SiO$_2$ if dielectric. All depositions take place in the presence of a dc magnetic field oriented along the direction of the longitudinal axes of the MR elements. A layer of photoresist 32' is patterned over the upper MR film 13' extending to establish the lengths and heights of the MR elements 12', 14' and spacer 16'. The deposited material is then etched away in a manner know in the art leaving the structure shown in FIG. 7b. In FIG. 7c a very thin insulating layer 33 (e.g. 10–20 angstroms) of $SiO_2$ is deposited to effectively break any exchange coupling between the cap material and the edges of the MR elements that may arise. The remaining steps illustrated in FIGS. 7c–7d are identical to those disclosed for FIGS. 2c–2d. A layer of magnetically permeable material 34' such as CoZr is then deposited over the exposed structure to obtain the configuration illustrated in FIG. 7c. The structure of FIG. 7c is subjected to a "lift off" process known in the art, providing the resultant structure seen in FIG. 7d. The current leads 18, 20 shown in FIG. 1 are then deposited onto the surface of the MR element 14' in a manner known in the art, and the substrate 10' is lapped along the line 36' to uncover the bottom face of the head which is the head-medium interface.

It will be noted in this embodiment, the electrical contact provided between the MR elements by the top cap material as disclosed in the previous embodiments is no longer present. This obviates the use of a dielectric spacer unless the head structure is provided with end caps to effect the electrical connection between the MR elements as described supra.

The invention has been described in detail with particular reference to preferred embodiments thereof, but it will be understood that variations and modifications can be effected within the spirit and scope of the invention.

What is claimed is:

1. A magnetic head assembly for detecting magnetically recorded signals from a magnetic medium comprising:

first and second rectangular thin film magnetoresistive elements, each of which has a long dimension with first and second long sides and a short dimension with first and second short ends connecting said long sides;

a spacer between said first and second magnetoresistive elements;

shorting means for electrically shorting said first ends and said second ends, respectively, of said first and second magnetoresistive elements;

current means connected to said shorting means for flowing a sense current through said first and second magnetoresistive elements between said first and second shorted ends, said sense current flow mutually magnetically self-biasing said first and second magnetoresistive elements anti-symmetric to one another along said long dimension;

a cap of magnetic permeable material extending along said long dimension of said elements, covering said elements and said spacer, along said first long sides of said elements; and means for orienting said magnetic head assembly relative to said magnetic medium so that said second long sides of said elements face said medium and so that magnetic fields from magnetically recorded signals on said medium are directed along the short dimension of said elements such that magnetic flux follows a path in one direction along the short dimension of said first element, is shorted through said cap, and follows a path along the short dimension of said second element in a direction opposite to said one direction.

2. The magnetic head assembly of claim 1 wherein said magnetic permeable material has an electrical conductivity less than the electrical conductivity of said magnetoresistive elements.

3. The magnetic head assembly of claim 2 wherein said spacer is a dielectric spacer.

4. The magnetic head assembly of claim 2 wherein said spacer is a conductive spacer.

5. The magnetic head assembly of claim 2 wherein said magnetic permeable material is CoZr.

6. The magnetic head assembly of claim 1 including end caps of magnetic permeable material extending along said short dimension of said elements, covering said elements and said spacer, along said first and second short ends of said elements, and longitudinal biasing means for biasing said elements along said long dimension, wherein the longitudinal magnetization of said first element is anti-parallel to the longitudinal magnetization of said second element, wherein said end caps serve as magnetic keepers for said longitudinal magnetizations.

7. The magnetic head assembly of claim 6 wherein said longitudinal biasing means comprises:

a) exchange biasing means provided on into said first magnetoresistive element wherein the longitudinal magnetization of said first magnetoresistive element is "pinned" in a first longitudinal direction, and wherein said longitudinal magnetization of said first magnetoresistive element is coupled to said second magnetoresistive element through said end caps, whereby the magnetization of said second magnetoresistive element is induced in a second longitudinal direction anti-parallel to said first longitudinal direction.

* * * * *